3,181,966
**PROCESS FOR IMPARTING SOIL RETARD-
ANCE TO THE PILE PORTION OF A TEX-
TILE MATERIAL**
Elliot S. Pierce, Kensington, Md., and Stanley S. Slowata, Piscataway Township, Middlesex County, and Samuel James O'Brien, Dunellen, N.J., assignors to American Cyanamid Company, New York, N.Y., a corporation of Maine
No Drawing. Filed Apr. 22, 1960, Ser. No. 23,923
2 Claims. (Cl. 117—37)

The present invention relates to compositions comprising basic aluminum salts, their process of manufacture, and to the process for using such compositions to impart soil resistance to textile materials, as well as to the materials so treated.

The compositions of the present invention are effective to improve the resistance to soiling or reduce the adherence or attraction of soil particles to textile materials and, in particular to pile fabrics.

In the textile field and particularly in the rug industry, where in recent years widespread usage has been made of pastel colors and the number of non-wool rugs, such as cotton and rayon or blends of these with wool have increased, the need for effective soil retardants has increased, both because of the colors employed and the fact that these materials soil more readily.

In response to the growing demand, numerous compositions have become available which function to impart soil resistance to textile materials and, in particular, rugs. Certain of these were organic in nature and applied as solutions and dried. Generally speaking, soil retardants of this type were less effective than water-insoluble inorganic types. These inorganic materials, while effective as soil retardants, suffer from severe limitations. Certain of these materials produce dusting, which limits their commercial acceptability, while others tend to so modify the "hand" of the treated material that their widespread commercial acceptance is seriously restricted.

In addition, many of the textile materials treated with inorganic materials of the prior art for soil retardancy cannot be dried after treatment at temperatures significantly over 100° C. in that the soil retardant inorganic material tends to discolor.

In the preparation of insoluble inorganic soil retardants of the prior art, the product is usually not useable directly from the reaction medium, and the manufacturer is frequently obliged to wash a precipitated product with large volumes of water to free a filter cake of undesirable ions resulting from the reaction. This requires additional processing and thus expense.

A very severe limitation on the commercial acceptance of certain of these water-insoluble inorganic materials as soil retardants is the fact that they cannot readily be shipped or transported from the point of manufacture to the point of use as a dry powder. This is true with respect to many of these inorganic materials in that the user, that is, the one applying them to the textile material, is unable to redisperse in aqueous medium the dried powder obtained from current products so as to obtain a stable dispersion of these products having the proper particle size for use. This is because drying of current products yields masses of hard aggregates which are either not redispersible or require drastic milling to effect dispersion, and the user usually does not possess the milling or grinding equipment necessary. In addition, finishers are reluctant to go through a number of mechanical steps such as, for example, regrinding the dried insoluble material and adding known dispersing agents to make up a batch, the preferred technique being simply to add to a pad bath or similar solution a readily mixed quantity of a stable dispersion.

In most instances, these insoluble inorganic materials may only be prepared in stable dispersions having solid contents up to about 30%. The net effect of this is that for every 30% by weight of active solids in a given container, 70% of water is also being shipped. Obviously, if a finisher could acquire a dry powder and readily prepare a dispersion of a desired concentration himself, without the need of milling or grinding and adding additional wetting or surface active agents, he would prefer to do so in that this procedure would be more highly economical to him.

Thus, it is an object of the present invention to provide novel compositions of insoluble basic aluminum salts which are suitable for imparting soil resistance to textile fabrics.

It is a further object to provide a process for making such compositions, for their application to textile materials, and to provide a textile fabric having the novel composition thereon.

It is a further object to provide a novel composition which may be applied to textile materials without significantly affecting the "hand" of the treated material and which does not alter the color of the treated material or produce whitening, as such change is known to those skilled in the art. In addition, it is an object to provide such a composition which does not result in significant dusting.

It is a further object to provide a soil retardant which, when applied to textile materials, the treated material may be dried at temperatures significantly in excess of 100° C. without discoloration. This permits the user or mill to more efficiently employ equipment and/or space, in that greater output in shorter times may be achieved.

Another object of the present invention is to provide a soil retardant and process for preparing the same which may be used directly from the reaction medium, and which does not require washing of the precipitated product with large volumes of water, thus eliminating extra processing on the part of the manufacturer.

It is a particularly important object of the present invention to provide a soil retardant composition which may be dried to a powdery state and readily redispersed in aqueous medium to form a stable dispersion without the aid of tedious milling or grinding or the addition of conventional dispersing agents.

These and other objects and advantages of the present invention will become apparent from the detailed description set forth hereinbelow.

According to the present invention, a process is provided for treating textile materials to impart soil resistance thereto which comprises applying to said material in effective amounts a stable dispersion comprising a water-insoluble basic aluminum salt having an ultimate particle size of less than .5 micron.

In the preparation of the basic aluminum salt composition, a water-soluble aluminum salt of an inorganic acid such as salts of sulfuric acid, sulfurous acid, hydrochloric acid, hydrobromic acid, nitric acid, nitrous acid, phosphoric, phosphorous and the like are employed. Such salts include, by way of example, aluminum sulfate, aluminum chloride, and aluminum nitrate. These compounds or their equivalents may be employed singly or in combination with one another. Frequently, these materials are most readily available in the form of their hydrates, and with respect to aluminum sulfate, that hydrate known as alum $(Al_2SO_4 \cdot 18H_2O)$ is readily available and preferred. While the alum illustrated herein has 18 molecules of water of crystallization, alums having 17 or even 16 moles of combined water are also fully contemplated, as are all of the known hydrates of this or any of the above illustrated or equivalent materials. The basic aluminum salt composition of this invention may be prepared by reacting a water-soluble alkali metal salt of an organic acid with water-soluble aluminum salt of an organic mineral acid, or an alkaline material other than an alkali metal salt of an organic acid, with a water-soluble salt of an inorganic mineral acid. In addition, an aluminum salt of an organic acid may be reacted with an alkaline material other than alkali metal salts of organic acids. Preferably, these reactions and known variations therein, either alone or in combination with one another, are carried out by mixing aqueous solutions of the reactants. As an alternative, for example, where the reactants contain significant amounts of water of crystallization, they may be mixed or ground together so that these products dissolve and react in their own water of crystallization. This latter alternative is obviously confined to those salts which contain water of crystallization and, in addition, is less desirable from the point of production.

As a further alternative, either the water-soluble aluminum salt or the alkaline material may be used in the reaction, in a substantially dry state, so long as the other essential component of the reactant is in aqueous solution and there is sufficient water present to result in a free-flowing dispersion.

Whether the alkaline material is added to the water-soluble aluminum salt or whether the water-soluble aluminum salt is added to the alkaline material, the pH of the final will be between about 4.5 and about 8. However, whether the alkaline material is added to the aluminum salt, or vice versa, will determine the pH range of aqueous dispersions of a particular basic aluminum salt composition. Thus, when the alkaline material is added to the water-soluble aluminum salt, the pH of a suitable dispersion will be within the range of from between about 4.5 and about 6.5, although in some instances, dispersions having higher pH's are useful. Normally when the pH of the dispersion is significantly in excess of about 6 it begins to thicken and becomes extremely difficult to handle. When the water-soluble aluminum salt is added to the alkaline material, the pH of a suitable dispersion will be from between about 6.5 and 8 and preferably from between about 7 to 7.5. The pH values may be determined in a conventional manner by employing a pH meter or indicator. Since the principal end use for these products is their use as soil retardants on pile textile material, it is highly desirable that they have a pH within the range of 4.5 to 8 so that when applied to the material, no degradation of the material occurs.

It should be noted that when dispersions prepared by either of the alternatives proposed above, that is, alkaline material to water-soluble aluminum salt or vice versa, that when these products are dried down and redispersed in water, the redispersed material is generally characterized by having substantially the same pH as the dispersion of the material in its freshly prepared state. It has been our experience that when the dispersions formed by addition of the alkaline material to the water-soluble aluminum salt are dried and redispersed in water that the pH of the redispersed material may change as much as about .5 upwardly or towards the neutral point, while the aqueous dispersions prepared from redispersing compositions prepared by the addition of water-soluble aluminum salts to alkaline material are generally characterized by a pH up to about .5 lower or nearer to the neutral point.

As examples of suitable alkaline materials, there are the alkali metal oxides and hydroxides, carbonates, bicarbonates, phosphates and borates, as well as the alkaline earth oxides, hydroxides, carbonates, phosphates and borates, and including ammonium compounds, such as ammonium hydroxides, carbonates, borates and phosphates and/or mixtures of these materials. When these water-soluble inorganic alkalizing agents are employed with the water-soluble salts of inorganic mineral acids, the resulting basic salt composition may generally be termed a composition of inorganic basic aluminum salts.

In order to prepare water-insoluble organic basic aluminum salts, a water-soluble aluminum salt of an inorganic mineral acid is preferably reacted with a water-soluble alkali metal salt of a suitable organic acid, examples of which include acetic acid, propionic acid, butyric acid, and the like. Examples of water-soluble salts of these materials suitable for use in the preparation of the basic aluminum salts employed in the process of the present invention are sodium acetate, sodium propionate, sodium butyrate, potassium propionate, lithium acetate, cesium propionate, and the like. Suitable salts may be used either singly or in combination with one another, according to this invention.

The water-soluble alkaline material, whether it be inorganic, such as sodium hydroxide or an alkali metal salt of an organic acid such as sodium acetate, are employed in the reaction in amounts which are insufficient to convert the water-soluble aluminum salt to the insoluble hydrate, but in sufficient amount to insure that the resulting precipitated composition contains a significant amount of a basic aluminum salt or mixtures of basic aluminum salts. In this connection, it should be noted that the composition of the precipitate does not appear to have any definite fixed chemical formulation, but is believed to contain mixtures of various basic salts, minor amounts of aluminum hydrate, as well as minor residual amounts of the initial reactants. With respect to residual amounts of reactants which are water soluble and which may become occluded in the insoluble precipitate, it is believed that this amount should not exceed about 12% of the total dry weight of the solid precipitate. In many instances, it has been found that minor amounts of such impurities are not wholly undesirable and, in certain specific instances, it has been found that where the amount contained in the final product is less than about 1% that the highly desirable property of ready redispersibility of the basic aluminum salt composition is reduced and therefore less satisfactory for general purposes. In fact, the entire reaction mixture may be used (e.g., Example 6 and following) and if any separation is made, it is unnecessary and, in some instances, undesirable to wash soluble salts from the filter cake. In this connection, if washing of a filtrate is desired, it has been determined that from between about 20% to about 100% of the total volume of water employed in the original reaction mixture produces a satisfactory product.

Whether the reaction product (freshly prepared dispersion) is further processed or not after formation, when the precipitate has formed and the pH of the dispersion mixture is normally between about 4.5 and about 8, it has the characteristics of a soil retardant material suitable for use in this invention.

While the amounts of water-soluble aluminum salt and water-soluble alkaline material are those amounts which will give a reaction mixture or dispersion having a pH within the range of between about 4.5 and 8 and, more specifically, between about 4.5 and about 6.5 when the alkaline material is added to the aluminum salt and from between about 6.5 and 8 when the aluminum salt is added to the alkaline material; it has been determined that in the former instance normally from between 2.6 and 4 equivalents of the alkaline reagent for 3 equivalents of the aluminum salt are necessary to achieve a pH value within the range of between 4.5 and 6.5. Preferably, in this order of addition, between 3.1 and 3.6 equivalents of a suitable alkaline material for 3 equivalents of the soluble aluminum salt will be employed. When the aluminum salt is added to the alkaline material, normally from between about 1.5 and 2.9 equivalents of the alkaline reagent for 3 equivalents of the soluble aluminum salt are necessary to achieve a pH value within the range of about 6.5 and 8. Preferably from between about 2.2 and 2.7 equivalents of the alkaline reagent is employed for 3 equivalents of the aluminum salt in this order of addition.

Employing the processes described above to prepare a dispersion having a pH from between about 4.5 and 8 results in a product believed to have the following general formula:

$$Al(OH)_{3-x}(Y)_{x/z}$$

wherein $x$ is a value greater than 1.5 up to and including 2.9, Y is an anion of the soluble aluminum salt reactant of the present process and $z$ is the valence of said anions.

In carrying out the process of this invention, heat is not essential. However, it may be employed and to advantage in certain instances. If employed, care msut be taken that its use with particular reactants does not increase operating difficulties such as increasing gelation, and the like. Normally, when the process is carried out at room temperature, uniformly good results are obtained.

The insoluble basic aluminum salt compositions of the present invention may be applied to surfaces and in particular textile materials in order to reduce their tendency to soiling by spraying, immersion, dipping, padding, exhaustion, or any other well-known general finishing process. This composition is normally employed on textile materials in amounts from between .25% and 5%, based on the weight of the fabric and, in the case of pile fabric, such as carpets and the like, based on the weight of the pile, and preferably in amounts of from between .5 and 1.5%, based on identical weight standards. Amounts significantly less than .25%, in most instances, are too low a concentration to effectively reduce soiling. When the amounts employed are in excess of 5%, while its resistance to soiling may be good, undesirable harshening of the hand of the treated fabric, dusting, and in some cases, whitening of the fabric, are incurred. All of these are undesirable.

The basic aluminum salts prepared by the process described herein have an average working particle size of between 0.5 and 1.5 microns and an ultimate particle size of less than 0.5 micron. Many of the particles in the dispersion do, of course, have working or aggregated particle sizes down to the order of .001 micron and less, and conversely these dispersions contain larger working particle sizes in minor amounts. These particle sizes may be from between 5 and 50 microns. With respect to this latter group, it is believed that it never constitutes more than 10% of the basic salt composition and thus does not impair its utility.

The particle size is an important aspect of the present invention, in that if particle sizes larger than the average particle size are present in substantial quantities as, for example, in amounts of 20% or more of the total composition, the effectiveness of the composition for purposes of imparting soil retardancy is greatly diminished. It is an advantage of the present invention that the basic aluminum salts employed herein, prepared according to the procedure outlined hereinabove and by way of example in greater detail hereinafter, substantially uniformly results in an ultimate particle size of less than .5 micron, and an average particle size of from between 0.5 to 1.5 microns.

After the textile material has been treated with the basic aluminum salt according to the present invention, the so treated fabric is dried. This may be accomplished by air drying, utilizing tenter frames, tumble drying, or any other suitable means. Normally, temperatures substantially in excess of 150° C. should be avoided. Lower temperatures may, of course, be employed with attendant increase in time being required.

The employment of the basic aluminum salts according to the present invention as soil retardant materials, as will be seen more fully hereinafter, are competitive with commercial soil retardant materials with respect to their soil retardancy and other effects on the treated material and, in addition, have the tremendous atvantage that they may be readily shipped as dried powder, thereafter being readily redispersed at the site of use to form stable dispersions. This aspect of ready redispersibility of the dried product of this invention is particularly apparent where dispersions containing between about 3 and 30% solids are concerned, and more particularly where the concentration of basic salt solids in the dispersion is between 5 and 20%.

In order that the present invention may be more fully understood, the following examples are given primarily by way of illustration. No details appearing therein should be construed as limitations on the present invention, except as they appear in the appended claims. All parts and percentages are by weight unless otherwise designated.

EXAMPLE 1

Six hundred parts (5.41 equivalents) of $$Al_2(SO_4)_3 \cdot 18H_2O$$

are dissolved in 500 parts of water by heating to 60° C. After being cooled to 40° C. the solution was mechanically stirred at this temperature and a solution of 790 parts (5.6 equivalents) of sodium acetate containing 3 molecules of water of crystallization in 390 parts of water was quickly added. The pH of the final reaction mixture was 4.5. A nearly clear syrup precipitates, which undergoes some solidification when the reaction mixture is continuously stirred. After standing for about 2 hours, the resulting precipitate, in the form of a crumbly cake, was broken up and suction filtered from the reaction mixture. The filter cake contained 50 to 55% of solids. The yield was from between 285 to 325 parts of solid. The undried filter cake, in this instance, could be converted into a stable slurry containing 30% solids by adding water thereto and stirring rapidly.

EXAMPLE 2

The filter cake mentioned in Example 1 above was air dried in an air circulating oven at 110° C. A light bulky powder was obtained which was readily redispersed in an aqueous medium to give a stable 30% solids dispersion.

In order to apply the basic aluminum acetate dispersion as a soil retardant to pile fabric, water was added with stirring to convert the 30% solids slurry first to a 10% solids and finally to a 1% solid suspension. This dilute suspension was then applied to a swatch of viscose pile carpet by dipping the pile portion only into a shallow bath containing the dispersion. The swatch is then squeezed until a 100% wet pick-up, based on the weight of the pile, is obtained. Thereafter, the sample is dried in a circulating oven at 105° C. until dry to the touch.

The treated viscose carpeting was not significantly whitened; nor was the band of the sample significantly changed. The soil retardancy was found to be comparable to commercially available soil retardants.

EXAMPLE 3

66.5 parts (0.60 equivalent) of $Al_2(SO_4)_3 \cdot 18H_2O$ and 37 parts of magnesium sulfate containing 7.5 molecules of water of crystallization (0.30 equivalent) were dissolved in 200 parts of water. Into this solution there was poured during stirring 21.2 parts of sodium carbonate (0.40 equivalent) dissolved in 30 parts of water. During the addition of sodium carbonate, the solution set up in a rigid gelatinous state, which required excessive stirring in order to achieve an end product which was believed to be primarily basic aluminum sulfate. The resulting precipitate was washed with about ½ of the original volume of water in the system, which washing was accompanied by stirring. The particles contained therein were less than 1 micron in diameter and occurred singly and in small flocs.

The above product was tested as a soil retardant material on standard viscose carpeting and a soiling index of 0.75 ws obtained, which was comparable to commercially available soil retardants.

EXAMPLE 4

54.2 parts (0.49 equivalent) of $Al_2(SO_4)_3 \cdot 18H_2O$ were dissolved in 75 parts of water at a temperature of between 70 and 80° C. Thereafter, the solution was cooled to about 40° C. and a second solution, having a temperature of about 40° C. and containing 51.0 parts (.54 equivalent) of sodium propionate in 60 parts of water was added thereto. The final pH of the reaction was 4.9. A precipitate formed immediately, which was diluted by the addition of 100 parts of water, after which the product was isolated. The average particle size was less than 1 micron. When this material was evaluated as a soil retardant, a soiling index of 0.80 was obtained.

EXAMPLE 5

46.4 parts (0.42 equivalent) of $Al_2(SO_4)_3 \cdot 18H_2O$ were dissolved in 43.4 parts of water and to this was added a solution of sodium butyrate to a final pH of 6.8.

The sodium butyrate solution was prepared by reacting 39 parts (0.45 equivalent) of butyric acid and 18.0 parts (0.45 equivalent) of sodium hydroxide in 59.9 parts of water at a pH of 5. A white opaque precipitate formed immediately, which was washed and isolated.

The particle size of the basic salt composition was less than 1 micron. This product, when tested for soil resistance on an all-viscose rug, gave a soiling index value of 0.73.

EXAMPLE 6

300 parts of $Al_2(SO_4)_3 \cdot 18H_2O$ (2.7 equivalents) are dissolved in 350 parts of water at 28° C. To this is added, with vigorous mechanical stirring, a solution of 129 parts of $Na_2CO_3$ (2.44 equivalents) dissolved in 517 parts of water. A thick, rigid, opaque, gelatinous slurry is formed which is extremely difficult to stir. The product has particles of one micron or less and the reaction mixture has a final pH of 7.1. Total solids (19 hours at 105° C.) are 18.2%. This material, when evaluated for soil retardance on standard viscose rayon pile fabric, gave good soil resistance.

EXAMPLE 7

241 parts of $AlCl_3 \cdot 6H_2O$ (3.0 equivalents) and 113 parts of 86.6% $H_3PO_4$ (3.0 equivalents) were dissolved in 259 parts of water. To this is added, with vigorous mechanical stirring, a 20% solution of $Na_2CO_3$ until the pH of the system is 7.3. Total parts of 20% $Na_2CO_3$ added is 978 (3.69 equivalents). At the end of the precipitation, the system is a semi-rigid, translucent gel. Soil retardance on standard viscose carpeting was excellent.

EXAMPLE 8

To a solution of $Al_2(SO_4)_3 \cdot 18H_2O$ in 500 parts of distilled water at about 40° C. and stirred at about 250 r.p.m., a solution of 736 parts of $NaOOC \cdot CH_3 \cdot 3H_2O$ in 30 parts of distilled water is added rapidly. The stirring is continued for 15 minutes after the addition and the reaction mixture is set aside for about 2–3 hours. The mixture remains clear during the addition of about 90% of the acetate solution. The final 10% produces a slight turbidity which, on standing 5 minutes, forms two liquid layers. The lower gummy layer is the basic aluminum acetate, the upper layer a concentrated solution of sodium sulfate.

The lower layer gradually becomes an opaque white solid which is separated by breaking up the cake and filtering.

EXAMPLE 9

A portion of the filter cake from Example 8 was dried overnight at 110° C. This material was hand ground by mortar and pestle and 100 parts of a 20% dispersion was prepared by stirring with an Eppenbach stirrer for one half hour. A stable dispersion resulted.

EXAMPLE 10

368 parts of $NaOAc \cdot 3H_2O$ was dissolved in 195 parts of water and stirred by means of an Eppenbach stirrer. Liquid alum, iron free, 54.5% $Al_2(SO_4)_3 \cdot 18H_2O$ was added dropwise to a pH of 7.1. This required a total of 275 parts of alum. High speed stirring was used. The ingredients were mixed at room temperature. There was no advantage in ease of preparation by this procedure over that used in Example 8. In neither case was there a heavy rigid gel phase to contend with. The supernatant liquid was decanted and the solid sucked free of liquor by suction. Overnight drying of the filter cake at 110° C. gave 46.0% solids.

EXAMPLE 11

A portion of the filter cake which had been dried overnight at 110° C. was hand ground and easily dispersed in water to make 100 grams of a 20% dispersion by stirring with an Eppenbach stirrer for one-half hour. A stable dispersion resulted.

EXAMPLE 12

To a solution of 23.2 parts of aluminum sulfate octadecahydrate, in 24 parts of water at room temperature, a solution of 22.9 parts of sodium butyrate in 30 parts of water was added with stirring to a final pH of 4.9. The product precipitated in the form of a cake. The cake was broken and filtered. The cake contained 27.3% of the basic aluminum butyrate. The molar butyrate to sulfate ratio in this preparation was 2.0:1.

EXAMPLE 13

A portion of the product of Example 12 was dried to constant weight. The dry material was soft and powdery. A dispersion containing 20% of this material in water was made by stirring with an Eppenbach stirrer. A stable dispersion resulted.

EXAMPLE 14

547 parts of $Al_2(SO_4)_3 \cdot 18H_2O$ in aqueous solution was added in small increments to 1000 parts of a 20% $Na_2CO_3$ solution with vigorous stirring. No rigid gel formation took place. 1305 parts of wet product was obtained. The solids, as determined by overnight drying at 110° C., were 21.8%.

One hundred grams of a 20% dispersion was readily prepared by the addition of the required amount of water and one-half hour stirring.

EXAMPLE 15

A portion of Example 14 was dried overnight at 110° C. and used to make a readily prepared dispersion by the procedure outlined under Example 9.

The results obtained on applying the products obtained from Examples 8 through 15 at 1% solids on standard viscose carpeting by padding, tumbling 1½ minutes and drying for 40 minutes at 105° C. are given in Table 1 hereinbelow.

Table 1

| | Soil index | Yellowing | | 1 minute at 300° F. | Hand | Whitening (red carpet) |
|---|---|---|---|---|---|---|
| | | Dusting | Initial | | | |
| SR #1 (STD) Composition containing normal phosphate salts. | 0.46 | V. slight | Std | Std | Std | Std. |
| Example 8—Basic aluminum acetate (filter cake). | 0.49 | None | Equal | Less | Equal | Sl. more. |
| Example 9—Basic aluminum acetate (dried). | 0.69 | ___do___ | ___do___ | ___do___ | ___do___ | Less. |
| Example 10—Basic aluminum acetate, reverse procedure (filter cake). | 0.61 | V. slight | ___do___ | ___do___ | ___do___ | Do. |
| Example 11—Basic aluminum acetate, reverse procedure (dried). | 0.42 | Slight | ___do___ | ___do___ | ___do___ | Do. |
| Example 13—Butyrate (dried). | 1.00 | ___do___ | ___do___ | Less equal to untreated. | ___do___ | Sl. more. |
| Example 14—Basic aluminum sulfate, as is. | 0.59 | V. slight | ___do___ | Sl. more | ___do___ | Less. |
| Example 15—Basic aluminum sulfate (dried). | 0.53 | ___do___ | ___do___ | Equal | ___do___ | Do. |

STD = Standard—A value to which other indicated values are relative.

In each of the above examples, the soiling index is determined by taking a reflectance reading before and after soiling of similar pieces of treated and untreated carpeting. The reflectance reading number for the untreated soiled piece is then divided into the reflectance reading number for the treated soiled piece to arrive at a soiling index number. The treated and untreated pieces of carpeting were soiled according to the following procedure. These pieces (i.e., the treated and untreated control pieces) are fastened to a 5" x 5" window in a revolving drum for the purpose of exposing the treated and control piece to soiling. Two grams of synthetic soil are placed in the perforated axle of the drum and 17½" steel balls and 18¼" steel balls were placed in the said drum. The opening in the drum was closed and the drum was rotated for 20 minutes. The samples were then removed and vacuumed.

EXAMPLE 16

In order to further demonstrate a principal property of the soil retardants of this invention, four different soil retardant materials, all containing between 20 and 27% solids, were oven dried to a constant weight. The resulting powders were redispersed by grinding in a mortar with a pestle for two to three minutes, after which four grams of distilled water were added for each gram of powder and grinding was continued for several additional minutes.

The dispersions obtained in this way were observed for differences in respective rates of sedimentation to determine stability of dispersions formed therewith.

The four soil retardant materials were:

Soil Retardant A—essentially a titania hydrate.
Soil Retardant B—essentially an aluminum sulfate.
Soil Retardant C—essentially aluminum oxide.
Soil Retardant D—a basic aluminum acetate composition prepared in accordance with this invention.

With respect to Soil Retardant A, as a freshly prepared dispersion it had a pH of 8.1 and when dried and redispersed in water in accordance with the above illustrated procedure it has a pH of about 5.8.

With respect to Soil Retardant B, as a freshly prepared dispersion it had a pH of 7.1 and when dried and redispersed, it had a pH of 6.8.

The original or freshly prepared dispersion of Soil Retardant C had a pH of 7.1 and when dried and redispersed, had a pH of 6.1.

The original or freshly prepared dispersion of Soil Retardant D, a soil retardant of the present invention had a pH of 4.5 and when dried and redispersed in accordance with the above procedure had a pH of 5.1.

The respective ratios of sedimentation for the four soil retardants were observed with the following results:

(1) Soil Retardant D gave a dispersion which was stable and suitable for application as a soil retardant material for at least 5 days.

(2) Soil Retardant A settled out appreciably from its dispersion in less than two hours.

(3) Soil Retardant B settled out from its dispersions in less than two hours and was much less suitable for continued application by normal padding and/or spray drying procedures.

(4) Soil Retardant C settled out in less than two hours and was much less suitable for uniform application to textiles by normal padding and/or spray drying procedures.

While the soil retardant composition of the present invention has been disclosed particularly for use on textile materials and, in particular to cellulosic materials such as rayon and cotton carpeting, it may also be applied with excellent results to materials of wool, cotton, jute, rayon, nylon, acrylics, polyesters and/or blends thereof. Preferably the textile material to be finished according to this invention should contain at least 50% cellulosic fiber. The soil retardant composition of this invention may be employed with other known soil retardants, such as normal phosphate, silicates, titanium hydrates and other known soil retardant materials. In addition, softeners, lubricants and the like may be employed where desired and where the effectiveness of the compositions as soil retardants is not significantly reduced.

This application is a continuation-in-part of our copending application Serial No. 647,485, filed March 21, 1957, which is now abandoned.

We claim:

1. A process for treating pile textile material to reduce the adherence and attraction of soil to the pile portion thereof, which comprises applying to the pile portion thereof a stable aqueous dispersion having a pH of between about 4.5 and about 8 of a water insoluble basic aluminum sulfate composition, so as to apply between about 0.25 to about 5% based on the weight of the pile of said composition and thereafter drying the material, said basic aluminum sulfate composition being characterized in that upon being dried it may be readily redispersed from the dry state in water without the addition of dispersing agents to form a stable dispersion, said dispersion containing as a soil retardant an insoluble basic aluminum sulfate of the following formula:

$$Al(OH)_{3-x}(SO_4)_{x/2}$$

wherein $x$ is a value greater than 1.5, said basic aluminum salt composition having an ultimate particle size of substantially less than 0.5 micron.

2. A process for treating pile textile material to reduce the adherence and attraction of soil to the pile portion thereof, which comprises applying to the pile portion thereof a stable aqueous dispersion having a pH of between about 4.5 and about 8 of a water insoluble basic aluminum acetate composition, so as to apply between about 0.25 to about 5% based on the weight of the pile of said composition and thereafter drying the material, said basic aluminum acetate composition being characterized in that upon being dried it may be readily redispersed from the dry state in water without the addition of dispersing agents to form a stable dispersion, said dispersion containing as a soil retardant an insoluble basic aluminum acetate of the following formula:

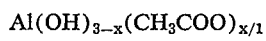

$$Al(OH)_{3-x}(CH_3COO)_{x/1}$$

wherein $x$ is a value greater than 1.5, said basic aluminum acetate composition having an ultimate particle size of substantially less than 0.5 micron.

References Cited by the Examiner
UNITED STATES PATENTS

| | | | |
|---|---|---|---|
| 2,236,074 | 3/41 | Schwartz | 117—169 |
| 2,622,307 | 12/52 | Cogovan et al. | 117—169 X |
| 2,734,834 | 2/56 | Raunard et al. | 117—169 |
| 2,734,835 | 2/56 | Florio et al. | 117—169 |
| 2,909,451 | 10/59 | Lawler et al. | 117—169 |
| 2,987,474 | 6/61 | Wilson | 117—169 |

WILLIAM D. MARTIN, *Primary Examiner.*
JOSEPH B. SPENCER, RICHARD D. NEVIUS,
*Examiners.*